(12) United States Patent
Valenti et al.

(10) Patent No.: US 9,243,099 B2
(45) Date of Patent: Jan. 26, 2016

(54) LOW VINYL STYRENE-BUTADIENE POLYMERS AND METHODS OF MAKING THE SAME

(75) Inventors: Silvia Valenti, Halle (DE); Evemarie Hamann, Halle (DE)

(73) Assignee: TRINSEO EUROPE GMBH, Horgen (CH)

( * ) Notice: Subject to any disclaimer, the term of this patent is extended or adjusted under 35 U.S.C. 154(b) by 40 days.

(21) Appl. No.: 13/702,685

(22) PCT Filed: Jun. 15, 2011

(86) PCT No.: PCT/EP2011/059918
§ 371 (c)(1),
(2), (4) Date: Dec. 7, 2012

(87) PCT Pub. No.: WO2011/157742
PCT Pub. Date: Dec. 22, 2011

(65) Prior Publication Data
US 2013/0090440 A1    Apr. 11, 2013

Related U.S. Application Data

(60) Provisional application No. 61/354,951, filed on Jun. 15, 2010.

(51) Int. Cl.
*C08L 9/06* (2006.01)
*C08F 236/10* (2006.01)
*C08F 212/08* (2006.01)

(52) U.S. Cl.
CPC ............... *C08F 236/10* (2013.01); *C08L 9/06* (2013.01); *C08F 212/08* (2013.01)

(58) Field of Classification Search
CPC ......... C08F 236/10; C08F 212/08; C08F 4/48
USPC ................................. 526/204, 340
See application file for complete search history.

(56) References Cited

U.S. PATENT DOCUMENTS 3,929,707 A * 12/1975 Berg et al. .................. 523/210
4,525,560 A * 6/1985 Smith ......................... 526/201

(Continued)

FOREIGN PATENT DOCUMENTS

CN    101155868    4/2008
EP    1865023      12/2007

(Continued)

OTHER PUBLICATIONS

Machine translated English equivalent of JP 05-148306 (Jun. 1993, 8 pages).*

(Continued)

*Primary Examiner* — Brieann R Fink
(74) *Attorney, Agent, or Firm* — Brinks Gilson & Lione

(57) ABSTRACT

The invention provides a process for the continuous polymerization of a polymer comprising monomeric units derived from styrene and 1,3-butadiene, said process comprising:
polymerizing the monomers in the presence of an initiator, and at least one polar agent selected from Formula 1;

Formula 1

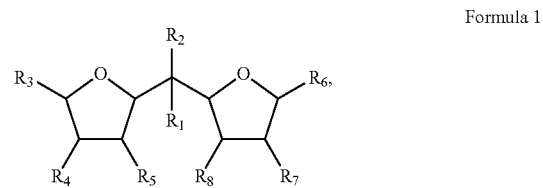

wherein R1 and R2 are each independently an alkyl, and preferably a C1-C4 alkyl; R3, R4, R5, R6, R7 and R8 are each independently selected from hydrogen or an alkyl, and preferably hydrogen or a C1-C4 alkyl;
and wherein a 1,2-diene is added to the polymerization, and the 1,2-diene to active initiator (active for polymerization) molar ratio is from 0.1 to 1.0, preferably from 0.1 to 0.9, and more preferably from 0.1 to 0.85; and
wherein the polar agent to the active initiator molar ratio is from 0.05 to 0.6, preferably from 0.1 to 0.5, more preferably from 0.15 to 0.3.

The invention also provides a composition comprising a polymer comprising monomeric units derived from styrene and 1,3-butadiene, and wherein the polymer has at least the following characteristics:
A) vinyl content from 12 to 40 weight percent, based on the weight of polymerized butadiene in the polymer,
B) block styrene content less than 8 weight percent, based on the weight of styrene in the polymer, and
C) a styrene content from 10 to 50 weight percent, based on the weight of the polymer.

11 Claims, 1 Drawing Sheet

(56) References Cited

U.S. PATENT DOCUMENTS

| | | | |
|---|---|---|---|
| 4,791,178 A * | 12/1988 | Fujimaki et al. | 525/332.6 |
| 5,134,199 A * | 7/1992 | Hattori et al. | 525/314 |
| 5,164,450 A | 11/1992 | Tsutsumi et al. | |
| 5,248,736 A * | 9/1993 | Suzuki et al. | 525/346 |
| 6,127,472 A * | 10/2000 | Kobayashi et al. | 524/492 |
| 6,693,160 B1 | 2/2004 | Halasa et al. | |
| 6,740,700 B2 * | 5/2004 | Kobayashi et al. | 524/492 |
| 2009/0111933 A1 * | 4/2009 | Yamada et al. | 524/502 |

FOREIGN PATENT DOCUMENTS

| | | | |
|---|---|---|---|
| JP | 57117508 A * | 7/1982 | |
| JP | 60-240746 | 11/1985 | |
| JP | 61-255917 | 11/1986 | |
| JP | 05148306 A * | 6/1993 | |
| WO | WO 2006/104215 | 10/2006 | |

OTHER PUBLICATIONS

Google translation page of content from Table 1 of JP 05-148306 (Jun. 2013, 1 page).*
JPO Abstract of JP 57117508 (Jul. 1982, 1 page).*
PCT/EP2011/059918, filed Jun. 15, 2011, International Search Report, completed Jul. 13, 2011.
PCT/EP2011/059918, filed Jun. 15, 2011, International Preliminary Report on Patentability, issued Dec. 19, 2012.
Communication, EP Application 11725449.0, action issued on Feb. 12, 2013.
Office Action, RU Application No. 2013101615, action issued on Feb. 23, 2013.
Office Action, RU Application No. 2013101615, action issued on Jan. 26, 2015.
Office Action, MX Application No. MX/a/2012/014834, action reported on Dec. 19, 2014.
Office Action, MX Application No. MX/a/2012/014834, action reported on Mar. 18, 2015.
Office Action, SA Application No. 111320530, action reported Apr. 12, 2014.
Office Action, SA Application No. 111320530, action reported Mar. 18, 2015.
Office Action, CN Application No. 201180028897.3, action reported Mar. 19, 2014.
Office Action, CN Application No. 201180028897.3, action reported Sep. 22, 2014.
Office Action, TH 1201006468, action reported Feb. 19, 2014.
Office Action, SA Application No. 111320530, action reported Apr. 2, 2015.
Official Communication, EP Application 11725449.0, action dated Sep. 15, 2015.

* cited by examiner

LOW VINYL STYRENE-BUTADIENE POLYMERS AND METHODS OF MAKING THE SAME

U.S. PROVISIONAL BENEFIT

This application is a National Stage application of International Application No. PCT/EP2011/059918, filed Jun. 15, 2011, which claims the benefit of U.S. Provisional Application No. 61/354,951, filed Jun. 15, 2010, the entire contents of each are hereby incorporated herein by reference.

BACKGROUND

Low vinyl SSBR (Solution Styrene Butadiene) is difficult to produce in a continuous polymerization due to the kinetics of copolymerization. Fast kinetics is required in a continuous polymerization to get an acceptable production rate and high conversion (low residual monomer concentration). Low vinyl SSBR is required to make a product with a high level of skid resistance and high abrasion resistance. It is not possible to produce low vinyl SSBR without special polar agents, so called randomizers, such as TMEDA (N,N,N',N'-tetramethylethylene diamine). However, the use of TMEDA in a continuous polymerization process, results in a SSBR product which contains a very high block styrene content. Such polymers are not suitable for tire application, because these polymers have a decreased rolling resistance.

Ditetrahydrofurylpropane (DTHFP) has been used as a randomizer for SSBR polymerization. However, when using DTHFP in batch processes for the production of low vinyl SSBR, the monomer conversion has to be kept below 95% to get SSBR with a low block styrene content (for example, see EP0215256). If the final conversion is low, a high amount of unreacted monomers remains in the final polymer solution, and an additional solvent purification process is required. There is a need for a continuous polymerization process to produce low vinyl SSBR with styrene blocks (for example, a styrene block content below 8 weight percent), and which achieves a high monomer conversion with minimal levels of residual monomers.

U.S. Publication No. 2009/0111933 discloses an oil-extended polymer composition comprising 100 parts by weight of a butadiene-based polymer having the following: a) a number average molecular weight (Mn) from 500,000 to 700,000, b) a molecular weight distribution (Mw/Mn) from 1.8 to 2.5, c) a monomodal distribution of polymer components having a molecular weight of 100,000 or more, and d) a vinyl content of the butadiene unit of 20 to 80 mole percent. The composition also contains a functional group-containing polymer component than can be adsorbed on silica, and an extender oil. The polymers described in this patent have however a high vinyl content which results in a final product with a low abrasion resistance. The use of a functionalization agent is claimed in order to optimize the polymer properties.

European Patent Application No. EP0215256 A1 discloses a process for preparing randomized copolymers of conjugated dienes and vinyl aromatic hydrocarbons, by using oligomeric oxolanyl alkanes, in amounts which effectively promote the randomization of the copolymers so produced. As previously described, in this patent, a low vinyl SSBR is obtained only in combination with a low conversion. A low conversion requires an additional solvent purification process to remove unreacted monomers.

U.S. Publication No. 2007/0219316 discloses a continuous polymerization process, carried out in the presence of at least two reactors in series, for the preparation of statistical vinyl arene/conjugated diene copolymers. The vinyl arene content range from 15 to 50 percent by weight. The polymerization is a copolymerization of vinyl arene/conjugated diene monomers, under isothermal conditions, in a hydrocarbon solvent, at a temperature ranging from 30° C. to 120° C., in the presence of at least one initiator and a 2-methoxy ethyl tetrahydrofuran (THFA-ethyl) modifier.

U.S. Pat. No. 4,672,097 discloses a process for preparing randomized copolymers of conjugated dienes and vinyl aromatic hydrocarbons, and which have low vinyl contents, by using an anionic initiator system, comprising alkali metal trihydrocarbyl magnesiates, optionally together with an organolithium compound. However such initiating system are not very soluble in hydrocarbon solvents and thus, not suitable in continuous polymerizations. In particular, in order to obtain a low vinyl level combined with a good randomization and high conversion, a high temperature has to be used, which causes the metallation and/or deactivation of the living chain ends.

Additional polymerizations and rubbers are disclosed in the following: U.S. Pat. Nos. 3,554,997, 4,429,091, 5,679,751, and 6,372,863, and European Patent Application No. 0019100A1.

As discussed, there remains a need for continuous polymerization processes to produce a low vinyl SSBRs with low block styrene contents. There is a further need for such a polymerizations that achieve high monomer conversions with minimal levels (for example, below 1000 ppm) of residual monomers. These needs have been met by the following invention.

SUMMARY OF THE INVENTION

The invention provides a process for the continuous polymerization of a polymer comprising monomeric units derived from styrene and 1,3-butadiene, said process comprising:

polymerizing the monomers in the presence of an initiator, and at least one polar agent selected from Formula 1;

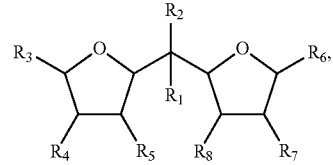

Formula 1 wherein R1 and R2 are each independently an alkyl, and preferably a C1-C4 alkyl; R3, R4, R5, R6, R7 and R8 are each independently selected from hydrogen or an alkyl, and preferably hydrogen or a C1-C4 alkyl;

and wherein a 1,2-diene is added to the polymerization, and the 1,2-diene to active initiator (active for polymerization) molar ratio is from 0.1 to 1.0, preferably from 0.1 to 0.9, and more preferably from 0.1 to 0.85; and wherein the polar agent to the active initiator molar ratio is from 0.05 to 0.6, preferably from 0.1 to 0.5, more preferably from 0.15 to 0.3.

The invention also provides a composition comprising a polymer comprising monomeric units derived from styrene and 1,3-butadiene, and wherein the polymer has at least the following characteristics:

A) vinyl content from 12 to 40 weight percent, based on the weight of polymerized butadiene in the polymer, B) block styrene content less than 8 weight percent, based on the weight of styrene in the polymer, C) a styrene content from 10 to 50 weight percent, based on the weight of the polymer.

DETAILED DESCRIPTION

Figure 1:
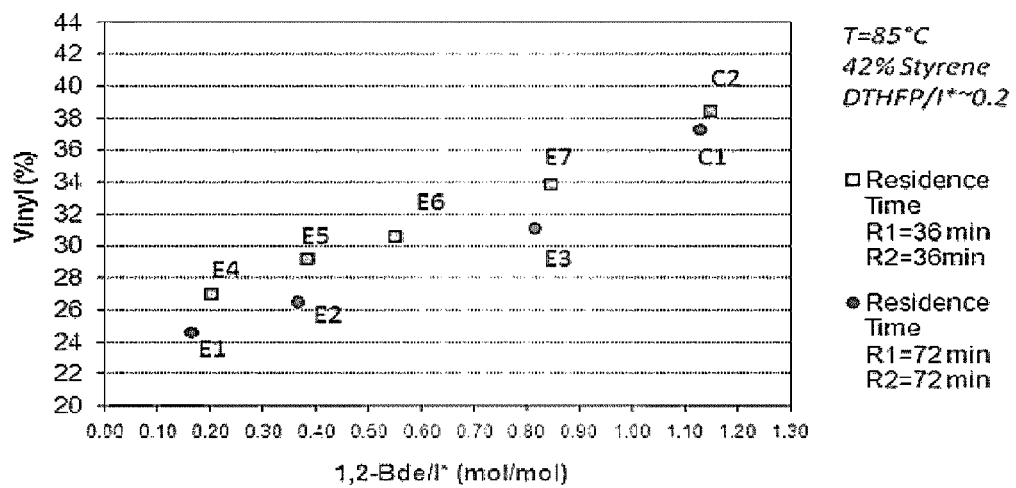
FIG. 1 shows the trend of the vinyl content as function of the 1,2-butadiene/active initiator molar ratio of the products obtained with two reactors and a residence time of 36 and 72 minutes in each polymerization reactor.

As discussed above, the invention provides a process for the continuous anionic polymerization of a polymer comprising monomeric units derived from styrene and 1,3 butadiene, said process comprising:

polymerizing the monomers in the presence of an initiator, and at least one polar agent selected from Formula 1;

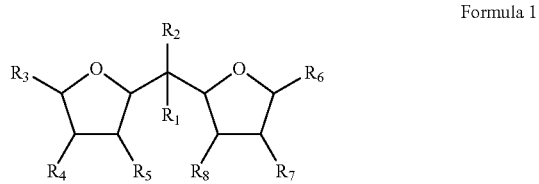

Formula 1 wherein $R_1$ and $R_2$ are each independently an alkyl group. In some embodiments, $R_1$ and $R_2$ are each independently a C1-C4 alkyl group. In some embodiments, $R_1$ and $R_2$ are each methyl.

In some embodiments, $R_3$, $R_4$, $R_5$, $R_6$, $R_7$ and $R_8$ are each independently selected from hydrogen or an alkyl, and preferably hydrogen or a C1-C4 alkyl. In some embodiments, $R_3$, $R_4$, $R_5$, $R_6$, $R_7$ and $R_8$ are each independently selected from the group consisting of hydrogen and a C1-C4 alkyl group. In some embodiments, $R_3$, $R_4$, $R_5$, $R_6$, $R_7$ and $R_8$ are each independently selected from the group consisting of hydrogen and methyl. In some embodiments, $R_3$, $R_4$, $R_5$, $R_6$, $R_7$ and $R_8$ are each hydrogen.

A 1,2-diene is added to the polymerization, and the 1,2-diene to active initiator (active for polymerization) molar ratio is from 0.1 to 1.0, preferably from 0.1 to 0.9, and more preferably from 0.1 to 0.85.

The polar agent to the active initiator molar ratio is from 0.05 to 0.6, preferably from 0.1 to 0.5, more preferably from 0.15 to 0.3.

In one embodiment, the 1,2-diene is represented by $H_2C=C=CHR$, wherein R is selected from hydrogen or an alkyl, and preferably hydrogen or a C1-C5 alkyl.

In one embodiment, the 1,2-diene is represented by $H_2C=C=CHR$, wherein R is selected from an alkyl, and preferably a C1-C5 alkyl.

In one embodiment, the 1,2-diene is 1,2-butadiene.

In one embodiment, the initiator may include those suitable for anionic polymerizations. In some embodiments, an initiator for use in accordance with the present teachings is an organolithium (e.g., alkyl lithium). Representative alkyl lithium agents for use in accordance with the present teachings include but are not limited to n-butyl lithium, sec-butyl lithium, tert-butyl lithium, n-pentyl lithium, and the like, and combinations thereof. In some embodiments, the initiator comprises n-butyl lithium.

In one embodiment, the polar agent is ditetrahydrofurylpropane ("DTHFP"), as shown below.

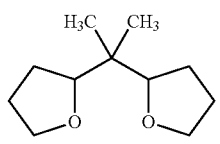

In one embodiment, the total monomer conversion is greater than 97.5 weight percent, preferably greater than 98 weight percent, and more preferably greater than 99 weight percent, based on total amount of monomer feed.

In one embodiment, the residual styrene or remaining styrene after completion of conversion is less than about 2400 ppm, preferably less than about 2100 ppm, or preferably less than about 2000 ppm, or more preferably less than about 1800 ppm.

In one embodiment, the polymerization is run at a temperature in the range from 30° C. to 120° C., preferably from 40° C. to 110° C., and more preferably from 75° C. to 95° C.

In one embodiment, total monomer content in the feed is from 5 to 35 weight percent, preferably from 10 to 30 weight percent, more preferably 12 to 28 weight percent, based on the total amount of monomer and solvent fed to the reactor.

In one embodiment, styrene:butadiene weight ratio in the feed is from 10:90 to 50:50, preferably from 20:80 to 43:57.

In one embodiment, the polymer has a vinyl content from 12 to 40 weight percent, preferably from 15 to 36 weight percent, more preferably from 20 to 30 weight percent, based on the weight of polymerized butadiene in the polymer.

In one embodiment, vinyl content in the polymer is from 20 to 34 weight percent, based on the weight of polymerized butadiene in the polymer.

In one embodiment, the polymer has a block styrene content less than 8 weight percent, preferably less than, or equal to, 7 weight percent, more preferably less than, or equal to, 6 weight percent, based on the weight of polymerized styrene in the polymer.

In one embodiment, the polymer has a styrene content from 10 to 50 weight percent, preferably from 15 to 45 weight percent, more preferably from 20 to 43 weight percent, based on weight of the polymer.

In one embodiment, the polymer has a Mooney Viscosity (ML 1+4 at 100° C.) from 30 to 90.

In one embodiment, the polymer has a Mooney Viscosity (ML 1+4 at 100° C.) from 20 to 150, preferably from 40 to 120.

In one embodiment, the polymer has a molecular weight distribution (MWD) from 1.5 to 3, preferably from 1.7 to 2.2.

In one embodiment, the polymer has a number average molecular weight (Mn) greater than, or equal to, 75,000 g/mole, preferably greater than, or equal to, 77,000 g/mole.

In one embodiment, the polymer has a number average molecular weight (Mn) from 70,000 to 500,000 g/mole, preferably from 70,000 to 300,000 g/mole.

In one embodiment, the polymer has a weight average molecular weight (Mw) greater than, or equal to, 105,000 g/mole, preferably greater than, or equal to, 130,000 g/mole.

In one embodiment, the polymer has a weight average molecular weight (Mw) from 105,000 to 1,500,000 g/mole, preferably from 130,000 to 900,000 g/mole.

In one embodiment, the polymerization solvent is selected from cyclohexane, hexane, heptanes, a mixture of cyclohexane with one or more alkanes, or a mixture of one or more of cyclohexane, hexane, and heptanes with butane.

In another embodiment, the solvent may include, but is not limited to, straight and branched-chain hydrocarbons, such as propane, butane, isobutane, pentane, hexane, heptane, octane, cyclic and alicyclic hydrocarbons, such as cyclohexane, cycloheptane, methylcyclohexane, and methylcycloheptane.

An inventive process may comprise a combination of two or more embodiments as described herein.

The invention also provides a polymer formed from an inventive process.

The invention also provides a composition comprising an inventive polymer.

The invention also provides an article comprising at least one component formed from an inventive composition. In a further embodiment, the article is a tire. In another embodiment, the article is a shoe component.

The invention also provides a composition comprising a polymer comprising monomeric units derived from styrene and 1,3-butadiene, and wherein the polymer has at least the following characteristics:

A) vinyl content from 12 to 40 weight percent, preferably from 15 to 36 weight percent, more preferably from 20 to 30 weight percent, based on the weight of polymerized butadiene in the polymer, B) block styrene content less than 8 weight percent, preferably less than, or equal to, 7 weight percent, more preferably less than, or equal to, 6 weight percent, based on the weight of polymerized styrene in the polymer, C) a styrene content from 10 to 50 weight percent, preferably from 15 to 45 weight percent, more preferably from 20 to 43 weight percent, based on the weight of the polymer.

In one embodiment, the polymer has a Mooney Viscosity (ML 1+4 at 100° C.) from 30 to 90.

In one embodiment, the polymer has a Mooney Viscosity (ML 1+4 at 100° C.) from 20 to 150, preferably from 40 to 120.

In one embodiment, the polymer has a molecular weight distribution (MWD) from 1.5 to 3, preferably from 1.7 to 2.2.

In one embodiment, the polymer has a number average molecular weight (Mn) greater than, or equal to, 75,000 g/mole, preferably greater than, or equal to, 77,000 g/mole.

In one embodiment, the polymer has a number average molecular weight (Mn) from 70,000 to 500,000 g/mole, preferably from 70,000 to 300,000 g/mole.

In one embodiment, the polymer has a weight average molecular weight (Mw) greater than, or equal to, 105,000 g/mole, preferably greater than, or equal to, 130,000 g/mole.

In one embodiment, the polymer has a weight average molecular weight (Mw) from 105,000 to 1,500,000 g/mole, preferably from 130,000 to 900,000 g/mole.

In one embodiment, the polymer is modified with a modifying agent (or modifier), selected from the group consisting of amines, amides, thioglycols, silicon alkoxides, and silane-sulfide modifiers.

In one embodiment, the polymer has a glass transition temperature ($T_g$) from 0° C. to −45° C., preferably from −5° C. to −45° C.

In one embodiment an inventive composition does not comprise an oil.

An inventive composition may comprise a combination of two or more embodiments as described herein.

An inventive polymer may comprise a combination of two or more embodiments as described herein.

The invention also provides an article comprising at least one component formed from an inventive composition. In a further embodiment, the article is a tire. In another embodiment, the article is a shoe component.

An inventive article may comprise a combination of two or more embodiments as described herein.

A continuous polymerization process has been discovered to produce low vinyl SSBR, with low block styrene content, at high conversions. Such SSBR is particularly required for used in tires, especially tire treads.

Typically very low, residual levels (5-20 ppm) of 1,2-butadiene are present in 1,3-butadiene. Such low levels are negligible with respect to the fed amount of 1,2-diene used in the inventive polymerization processes described herein. It has been discovered that using 1,2-butadiene in combination with ditetrahydrofuryl propane (DTHFP), in a continuous polymerization process, as described above, produces SSBRs with low amounts of vinyl and low amounts of block styrene. In addition, very high monomer conversions (greater than 98 wt %) are also achieved. A high monomer conversion is cost effective, and eliminates the need to remove and recover residual monomers.

Also, the final polymer is still living and can be chain-end modified, for example, by modification and/or coupling reactions. The appropriate chain end modifier and/or coupling agent has to be chosen according to the target application and filler. Modifiers include, but are not limited to, sulfenyl halides (see EP1016674 incorporated herein by reference), benzophenone, isocyanate, hydroxyl mercaptans (see EP 0464478 incorporated herein by reference), and acrylamide compounds (see EP0334042 incorporated herein by reference). Other modifiers include amines, amides, imides, and nitriles modifiers (for example see EP548799, EP510410, EP451604, EP180141, U.S. Pat. No. 4,412,041, each incorporated herein by reference). On the other hand, special silanes, including, but not limited to, epoxy-containing silanes, are used for modifying the polymer chain end for use in silica fillers (for example, see EP-A-299074, EP-A-102045, EP0447066, EP0692493, each incorporated herein by reference). Additional modifiers, or the patent references referring to such, are disclosed in WO 2009/134665, incorporated herein by reference. Suitable modifiers include methoxysilanes and tin chlorides.

Other suitable chain end modifier and/or coupling agent include a tin halide, a silicon halide, a tin alkoxide, a silicon alkoxide, or a mixture of the aforementioned compounds.

Common halide coupling agents include tin tetrachloride, tin tetrabromide, tin tetrafluoride, tin tetraiodide, silicon tetrachloride, silicon tetrabromide, silicon tetrafluoride, silicon tetraiodide, tin and silicon trihalides or tin and silicon dihalides can also be used. Polymers coupled with tin or silicon tetrahalides have a maximum of four arms (or four coupled polymer chains), tin and silicon trihalides have a maximum of three arms and tin and silicon dihalides have a maximum of two arms. Alkoxysilanes, hexahalo disilanes or hexahalo disiloxanes can also be used as coupling agents. Useful tin and silicon halides coupling agents include: $SnCl_4$, $(R_1)_3SnCl$, $(R_1)_2SnCl_2$, $R_1SnCl_3$, $SiCl_4$, $(R_1)_3SiCl$, $(R_1)_2SiCl_2$, $R_1SiCl_3$, $Cl_3Si-SiCl_3$, $Cl_3Si-O-SiCl_3$, $Cl_3Sn-SnCl_3$, $Cl_3Sn-O-SnCl_3$. Examples of tin and silicon alkoxides coupling agents include: $Sn(OMe)_4$, $Si(OMe)_4$, $Sn(OEt)_4$ or $Si(OEt)_4$.

Such agents can be continuously added during the polymerization, in cases where asymmetrical coupling is desired. This continuous addition is normally done in a reaction zone separate from the zone where the bulk of the polymerization is occurring. The coupling agent can be added in a hydrocarbon solution, for example, cyclohexane, to the polymerization admixture with suitable mixing for distribution and reaction. The coupling agent will typically be added only after a high degree of conversion has already been attained. For instance, the coupling agent will normally be added only after a monomer conversion of greater than about 85 percent has been realized. It will typically be preferred for the monomer conversion to reach at least about 90 percent before the coupling agent is added. In one embodiment, the coupling and/or chain end modification can be done by adding the modifying agent in the last polymerization reactor, after a conversion of at least 97% has been reached in the previous reactor. For example, Example 9 describes a polymerization experiment in which the polymerization is performed in the first reactor, and tetramethoxysilane (TMS, coupling agent) is added in the second (and last) reactor.

Additives

The invention provides for a composition comprising an inventive polymer as described herein and at least one additive. In one embodiment, the polymer is combined, and/or reacted with, one or more fillers, a vulcanization agent, and optionally, additional additives including, but not limited to, accelerators, coupling agents, and unmodified, uncrosslinked elastomeric polymers (that is conventional uncrosslinked elastomeric polymers that have not been reacted with a modifier, but that have been prepared and terminated as is conventional in the art).

In one embodiment, the polymer formulation contains one or more fillers, which serve as reinforcement agents. Examples of suitable fillers include carbon black, silica, carbon-silica dual-phase filler, clay, calcium carbonate, magnesium carbonate. In one embodiment, the combination of carbon black and silica, the carbon-silica dual-phase-fillers, or the combination of carbon-silica dual-phase-filler and carbon black and/or silica are used. Carbon black is typically manufactured by a furnace method, and has a nitrogen adsorption specific surface area from 50 to 200 m²/g, and a DBP oil absorption from 80 to 200 ml/100 grams; for example, FEF, HAF, ISAF, or SAF class carbon black. In one embodiment, a "high agglomeration type" carbon black is used. In one embodiment, carbon black or silica is added in an amount from 2 to 100 parts by weight, and preferably from 5 to 100 parts by weight, more preferably from 10 to 100 parts by weight, and even more preferably from 10 to 95 parts by weight, for 100 parts by weight of the total elastomeric polymer. A polymer formulation may also contain an oil.

Definitions

The term "composition," as used herein, includes a mixture of materials, which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer, usually employed to refer to polymers prepared from only one type of monomer, and the term interpolymer as defined hereinafter.

The term "interpolymer," as used herein, refers to polymers prepared by the polymerization of at least two different types of monomers. The generic term interpolymer thus includes copolymers, usually employed to refer to polymers prepared from two different types of monomers, and polymers prepared from more than two different types of monomers.

The term "vinyl content," as used herein, refers to the mass (or weight) percentage of butadiene that incorporates in the 1,2 position in the polymer chain, and is based on the butadiene portion (total amount of polymerized butadiene) in the polymer.

The term "styrene content," as used herein, refers to the mass (or weight) percentage of styrene in the polymer, based on the weight of the polymer.

The terms "styrene block fraction," or "block styrene content," or similar terms, as used herein, refer to weight fraction of styrene, based on the total amount polymerized styrene in the polymer, which is incorporated as styrene sequences longer than six styrene units.

The term "continuous polymerization," as used herein, refers to a polymerization process in which the solvent, the monomer(s), and all the ingredients, necessary to perform the polymerization reaction, are fed in a continuous matter to a reactor in the specified volumetric ratios. Typically two or more polymerization reactors connected in series are used, however, the reagents may be fed to only one reactor.

The term "active initiator" (I*), as used herein, refers to the amount of initiator that takes part in the polymerization reaction, and is not deactivated by impurities contained in the reaction medium. For example, the active butyllithium ($\dot{n}_{I^*}$ [mol/min]) is calculated based on the absolute number average molecular weight (Mn) of the final polymer, the conversion, and the total charged amount of monomers $$(\dot{m}_{Bde}(g/min) + \dot{m}_{Sty}(g/min)),$$

$$\dot{n}_I \cdot (mol/min) = \frac{(\dot{m}_{Bde}(g/min) + \dot{m}_{Sty}(g/min)) \times C}{Mn(g/mol)},$$

where
C=Total Monomer Conversion (%, expressed as a decimal), and
Mn=Average numeral molecular weight.

The phrase "total amount of monomer feed," as used herein, refers to the total amount of styrene and butadiene, in g/min, fed in a continuous polymerization reactor, and typically fed in the first continuous polymerization reactor.

The phrase "total monomer conversion," as used herein, refers to the final monomer conversion (for example, the final sum conversion of styrene and butadiene) determined for the last polymerization reactor.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Size Exclusion Chromatography (SEC)

Molecular weight and molecular weight distribution were determined using Size Exclusion Chromatography (SEC), based on polystyrene standards. Each polymer sample (9-11 mg) was dissolved in 10 ml tetrahydrofuran to form a solution. The solution was filtered using a 0.45 μm filter. A 100 μl sample was fed into a SEC column (Hewlett Packard System 1100 with 3 PLgel 10 μm MIXED-B columns). Refraction Index (RI) detector was used for analyzing the molecular weight. The molecular weight (polymer sample) was calculated as polystyrene, based on the calibration with EasiCal PS1 (Easy A and B) Polystyrene Standards from Polymer Laboratories. The molecular weight as SSBR was calculated dividing the molecular weight as Polystyrene (PS) by the factor 1.45 (MnPS/1.45=MnSSBR).

GC Analysis to Measure Monomer Conversion

Monomer conversion was determined by measuring the residual monomer concentration in the polymer solution at the end of the polymerization by mean of gas chromatography. About "0.5 g of polymer solution" was collected in a 20 ml vial, and diluted 1:10 using cyclohexane. About "30 mg of the diluted sample" was weighed, using a syringe, into a sealed headspace vial. The sample was heated to 140° C. for 10 minutes. The headspace was analyzed by GC using the following conditions shown in Table 1.

TABLE 1

GC Conditions

| Device: | HP 5890 with HP 7694 |
|---|---|
| Column: | PE-1 60 m × 0.32 mm × 1.0 µm |
| Detector: | FID |
| Temperature Program: | From 40° C. to 150° C., 8° C./min; hold 0.5 min |
| Head pressure: | 110 kPa |

Different standard solutions each of a known concentration of the components of interest (butadiene and styrene) were prepared. A calibration curve for each component was prepared by analyzing the standard solutions (the peak area is reported as function of the concentration of the respective component). The concentration of each component in the sample solution was calculated according to these calibration curves.

The maximum Total Solid Content (TSC) is calculated based on the total amount of ingredients fed.

TSC max=(g/minBde+g/minSty)/(TF)*100%.

TF(Total Flow, g/min)=(Bde(g/min)+Sty(g/min)+ DTHFP(g/min)+BuLi(g/min)+1,2-Butadiene (g/min)+Cyclohexane (g/min)).

Bde=1,3-Butadiene
Sty=Styrene
BuLi=Butyl Lithium

In all the examples, a total solid content of 12% was employed. The result of GC analysis is normally given in ppm of residual monomers contained in the original polymer solution.

The amount of residual monomers [RM] in "g/min" can be calculated from the following formula:

RM(g/min)=((((g/minBde+g/minSty)/12)*100)/ 1000000)*(ppmBde+ppmSty)) or alternatively RM(g/min)=(TF/1000000)*(ppmBde+ppmSty)

The monomer conversion was calculated as: C (%)=100−(RM/(g/minBd+g/minSt)*100).

1H-NMR

Vinyl and total styrene content was measured using 1H-NMR, following ISO 21561-2005, using a NMR spectrometer BRUKER AVANCE 200, and a 5 mm Dual probe. The CDCl3/TMS was used as solvent in a weight ratio of 0.05/99.9.

The content of vinyl units (1,2-butadiene units referred only to the butadiene part) is calculated according to the following formula:

% Vinyl=(% Bd1,2)/(% Bd1,2+% Bd1,4).

The fraction of the block styrene (block styrene content) of the total styrene content, here defined as styrene sequences as longer than 6 units, was estimated, as recommended by Tanaka et al., in Rubber Chemistry and Technology (1981), 54(4), 685-91. The fraction of styrene sequences longer than six units is estimated from the relative intensity of ortho-Ph proton signals resonated higher than 6.7 ppm.

Mooney Viscosity ML1+4 (100° C.)

Mooney viscosity on polymer (no filler and no oil) was measured according to ASTM D 1646 (2004), with a preheating time of one minute, and a rotor operation time of four minutes, at a temperature of 100° C. [ML1+4(100° C.)] on a MV2000 E from Alpha-Technologies.

EXAMPLES

Reactor Conditions

The following polymerization experiments were performed by mean of two continuous stirred tank reactors (CSTRs) connected in series. Each reactor had a volume of 6.3 liter, and was equipped with a helicoidal stirrer, suitable for mixing of high viscous solutions. The reactors were run at full capacity. External water circulation in the reactor walls regulated the desired reaction temperature. The reagents (styrene, butadiene, cyclohexane, ditetrahydrofurylpropane (DTHFP), 1,2-butadiene (1,2-Bde) and n-butyl lithium (BuLi)) were fed into the head of the first reactor with mass flow-meters. Each flow-meter regulated the desired feed, and guaranteed a constant flow of the reagent. Cyclohexane was purified by passing it through an alumina column. The initiator (n-butyl lithium in cyclohexane) was fed at the inlet of the first reactor. In one example tetramethoxysilane (TMS) was added, as coupling agent, at the head of the second reactor. DTHFP, 1,2-butadiene, and tetramethoxysilane were diluted in cyclohexane, in order to dose the exact amount to the reaction. The total amount of dosed cyclohexane is reported in the examples.

The polymerizations were performed under exclusion of moisture and oxygen, in a nitrogen atmosphere.

Reagents

Cyclohexane (distilled) was used as a solvent. The 1,3-butadiene (distilled) and styrene (dried via $CaH_2$) were used as monomers. Ditetrahydrofurylpropane (DTHFP) and 1,2-butadiene were diluted in cyclohexane. Methanol (Merck) was used as a termination agent.

Example 1, E1

A styrene/butadiene copolymerization was performed using the reactor conditions described above. A weight ratio of monomers (styrene (Sty) and 1,3-butadiene (Bde)) to the total amount of monomers and cyclohexane (defined as TSC, total solid content) of 12% was employed. The following conditions were used: a) weight ratio of styrene to butadiene of 42 to 58, b) molar ratio of DTHFP to active butyl lithium (mol/mol) of 0.17, c) total mol Li/"kg of monomers" of 0.0010, and d) molar ratio of 1,2-Bde to active butyl lithium of 0.164. The temperature of both the reactors was kept at 85° C. The flow of the total amount of ingredients and solvent was regulated in order to get a residence time of 72 minutes in each of the two reactors.

The polymer solution in the first reactor was transferred to the second reactor, and the polymerization reaction was continued for a residence time of 72 minutes.

The following amounts were fed into the first polymerization reactor: Sty=3.24 g/min, Bde=4.48 g/min, Cyclohexane=56.61 g/min, BuLi=0.078 mmol/min (0,0017 mmol/min of BuLi for impurities and 0.0763 mmol/min of active BuLi), DTHFP=0.013 mmol/min, 1,2-Bde=0.0125 mmol/min.

Methanol, as a termination agent, and IRGANOX 1520 (0.15 phr), as an antioxidant, were added to the polymeric solution out from the second reactor. A monomer conversion of 95.2% (4860 ppm Sty, 850 ppm Bde) was achieved in the first reactor, and a total monomer conversion of 99.94% (20 ppm Bde, 50 ppm Sty) was achieved in the second reactor.

The monomer conversion was calculated by measuring the amount of residual monomers via GC (Gas Chromatography). The polymer from the second reactor was analyzed by SEC, and had the following properties: Mn=98,900, Mw=213700, MWD=2.161. The microstructure and styrene block content was measured by 1H-NMR. The following results were obtained: styrene=41.9%, vinyl (1,2-polybutadiene, calculated on the butadiene fraction)=24.6%, block styrene=6%. The Mooney Viscosity ML1+4 of polymer was 39.6.

1) Calculation of the monomer conversion in R1
GC Results $$\text{ppm } Sty\,R1 = 4860$$

$$\text{ppm } BdeR1 = 850$$

$$56.61 + 4.48 + 3.24 = 64.33 \text{ g/min total flow}$$

$$\frac{64.33}{1000000} \times (4860 \text{ ppm } Sty + 850 \text{ ppm } Bde) =$$

$$0.367 \text{ g/min residual monomers}$$

$$\text{Conversion } R1(\%) = \left(100 - \left(\frac{0.367}{4.48 \text{ g/min } Bde + 3.24 \text{ g/min } Sty}\right) \times 100\right)$$

$$= 95.25\%$$

2) Calculation of the total monomer conversion in R2
GC Results $$\text{ppm } Sty\,R2 = 20$$

$$\text{ppm } BdeR2 = 50$$

$$\frac{64.33}{1000000} \times (20 \text{ ppm } Sty + 50 \text{ ppm } Bde) =$$

$$0.00450 \text{ g/min residual monomers}$$

$$\text{Conversion } R2(\%) = \left(100 - \left(\frac{0.00450}{4.48 \text{ g/min } Bde + 3.24 \text{ g/min } Sty}\right) \times 100\right)$$

$$= 99.99\%$$

Example 2, E2

The polymerization was performed in the same manner as in Example 1. The following conditions were used: a) weight ratio of styrene to butadiene of 42 to 58, b) molar ratio of DTHFP to active butyl lithium (mol/mol) of 0.201, c) total mol Li/"kg of monomers" of 0.0123, and d) molar ratio of 1,2-Bde to active lithium (mol/mol) of 0.366.

The following amounts were fed into the first polymerization reactor: Sty=3.24 g/min, Bde=4.48 g/min, cyclohexane=56.61 g/min, BuLi=0.0945 mmol/min (0.011 mmol/min of BuLi for impurities and 0.0826 mmol/min of active BuLi), DTHFP=0.0166 mmol/min, 1,2-Bde=0.0303 mmol/min. The residence time was 72 minutes in each reactor.

A monomer conversion of 95.52% (840 ppm Bde, 4450 ppm Sty) was achieved in the first reactor, and a total monomer conversion of 99.97% (30 ppm Bde, 1 ppm Sty) was achieved in the second reactor. The polymer from the second reactor was analyzed by SEC, and had the following properties: Mn=91,100, Mw=174,700, MWD=1.917.

The microstructure and styrene block content was measured by 1H-NMR. The following results were obtained: styrene=42.4%, vinyl (1,2-polybutadiene, calculated on the butadiene fraction)=26.5%, block styrene=6%.

Example 3, E3

The Polymerization was performed in the same manner as in Example 1. The following conditions were used: a) weight ratio of styrene to butadiene of 42 to 58, b) molar ratio of DTHFP to active butyl lithium (mol/mol) of 0.179, c) total mol Li/"kg of monomers" of 0.0123, and d) molar ratio of 1,2-Bde to active lithium (mol/mol) of 0.814.

The following amounts were fed into the first polymerization reactor: Sty=3.24 g/min, Bde=4.48 g/min, cyclohexane=56.61 g/min, BuLi=0.0945 mmol/min (0.0016 mmol/min of BuLi for impurities and 0.0929 mmol/min of active BuLi), DTHFP=0.0166 mmol/min, 1,2-Bde=0.0756 mmol/min. The residence time was 72 minutes in each reactor.

A monomer conversion of 93.64% (2100 ppm Bde, 5400 ppm Sty) was achieved in the first reactor, and a total monomer conversion of 99.72% (10 ppm Bde, 300 ppm Sty) was achieved in the second reactor. The polymer from the second reactor was analyzed by SEC, and had the following properties: Mn=78,150, Mw=138,300, MWD=1.77.

The microstructure and styrene block content was measured by 1H-NMR. The following results were obtained: styrene=42.2%, vinyl (1,2-polybutadiene, calculated on the butadiene fraction)=31.1%, block styrene=3%.

Example 4, E4

The polymerization was performed in the same manner as in Example 1. The following conditions were used: a) weight ratio of styrene to butadiene of 42 to 58, b) molar ratio of DTHFP to active butyl lithium (mol/mol) of 0.221, c) total mol Li/"kg of monomers" of 0.0123 and d) molar ratio of 1,2-Bde to active lithium (mol/mol) of 0.201.

The following amounts were fed into the first polymerization reactor: Sty=6.484 g/min, Bde=8.955 g/min, cyclohexane=113.21 g/min, BuLi=0.191 mmol/min (0.039 mmol/min of BuLi for impurities and 0.152 mmol/min of active BuLi), DTHFP=0.0336 mmol/min, 1,2-Bde=0.0306 mmol/min. The residence time was 36 minutes in each reactor.

A monomer conversion of 90.585% (2460 ppm Bde, 8650 ppm Sty) was achieved in the first reactor, and a total monomer conversion of 99.67% (20 ppm Bde, 340 ppm Sty) was achieved in the second reactor. The polymer from the second reactor was analyzed by SEC, and had the following properties: Mn=91,600, Mw=169,900, MWD=1.855.

The microstructure and styrene block content was measured by 1H-NMR. The following results were obtained: styrene=42.5%, vinyl (1,2-polybutadiene, calculated on the butadiene fraction)=27.0%, block styrene=7%.

Example 5, E5

The polymerization was performed in the same manner as in Example 1. The following conditions were used: a) weight ratio of styrene to butadiene of 42 to 58, b) molar ratio of DTHFP to active butyl lithium (mol/mol) of 0.211, c) total mol Li/"kg of monomers" of 0.0123 and d) molar ratio of 1,2-Bde to active lithium (mol/mol) of 0.384.

The following amounts were fed into the first polymerization reactor: Sty=6.484 g/min, Bde=8.955 g/min, cyclohexane=113.21 g/min, BuLi=0.191 mmol/min (0.032 mmol/min of BuLi for impurities and 0.159 mmol/min of active BuLi), DTHFP=0.0336 mmol/min, 1,2-Bde=0.0611 mmol/min. The residence time was 36 minutes in each reactor.

A monomer conversion of 90.25% (2700 ppm Bde, 8810 ppm Sty) was achieved in the first reactor, and a total monomer conversion of 99.03% (160 ppm Bde, 900 ppm Sty) was achieved in the second reactor. The polymer from the second reactor was analyzed by SEC, and had the following properties: Mn=88,800, Mw=162,800, MWD=1.833.

The microstructure and styrene block content was measured by 1H-NMR. The following results were obtained: styrene=42.4%, vinyl (1,2-polybutadiene, calculated on the butadiene fraction)=29.2%, block styrene=6%.

Example 6, E6

The polymerization was performed in the same manner as in Example 1. The following conditions were used: a) weight ratio of styrene to butadiene of 42 to 58, b) molar ratio of DTHFP to active butyl lithium (mol/mol) of 0.202, c) total mol Li/kg of monomers of 0.0123, and d) molar ratio of 1,2-Bde to active lithium (mol/mol) of 0.552.

The following amounts were fed into the first polymerization reactor: Sty=6.484 g/min, Bde=8.955 g/min, cyclohexane=113.21 g/min, BuLi=0.191 mmol/min (0.025 mmol/min of BuLi for impurities and 0.166 mmol/min of active BuLi), DTHFP=0.0336 mmol/min, 1,2-Bde=0.09171 mmol/min. The residence time was 36 minutes in each reactor.

A monomer conversion of 89.60% (3745 ppm Bde, 8530 ppm Sty) was achieved in the first reactor, and a total monomer conversion of 99.18% (30 ppm Bde, 870 ppm Sty) was achieved in the second reactor. The polymer from the second reactor was analyzed by SEC, and had the following properties: Mn=85,300, Mw=151,500, MWD=1.776.

The microstructure and styrene block content was measured by 1H-NMR. The following results were obtained: styrene=42.3%, vinyl (1,2-polybutadiene, calculated on the butadiene fraction)=30.6%, block styrene=3%.

Example 7, E7

The polymerization was performed in the same manner as in Example 1. The following conditions were used: a) weight ratio of styrene to butadiene of 42 to 58, b) molar ratio of DTHFP to active butyl lithium (mol/mol) of 0.186, c) total mol Li/"kg of monomers" of 0.0123, and d) molar ratio of 1,2-Bde to active lithium (mol/mol) of 0.845.

The following amounts were fed into the first polymerization reactor: Sty=6.484 g/min, Bde=8.955 g/min, cyclohexane=113.21 g/min, BuLi=0.191 mmol/min (0.01 mmol/min of BuLi for impurities and 0.181 mmol/min of active BuLi), DTHFP=0.0336 mmol/min, 1,2-Bde=0.153 mmol/min. The residence time was 36 minutes in each reactor.

A monomer conversion of 88.32% (4950 ppm Bde, 8835 ppm Sty) was achieved in the first reactor, and a total monomer conversion of 98.32% (230 ppm Bde, 1615 ppm Sty) was achieved in the second reactor. The polymer from the second reactor was analyzed by SEC, and had the following properties: Mn=78,600, Mw=134,500, MWD=1.711.

The microstructure and styrene block content was measured by 1H-NMR. The following results were obtained: styrene=41.5%, vinyl (1,2-polybutadiene, calculated on the butadiene fraction)=33.8%, block styrene=2%.

Example 8, E8

The polymerization was performed in the same manner as in Example 1. The following conditions were used: a) weight ratio of styrene to butadiene of 26 to 74, b) molar ratio of DTHFP to active butyl lithium (mol/mol) of 0.196, c) total mol Li/"kg of monomers" of 0.0147, and d) molar ratio of 1,2-Bde to active lithium (mol/mol) of 0.348.

The following amounts were fed into the first polymerization reactor: Sty=2.06 g/min, Bde=5.68 g/min, cyclohexane=56.76 g/min, BuLi=0.114 mmol/min (0.022 mmol/min of BuLi for impurities and 0.092 mmol/min of active BuLi), DTHFP=0.0180 mmol/min, 1,2-Bde=0.0320 mmol/min. The residence time was 72 minutes in each reactor.

A monomer conversion of 97.67% (650 ppm Bde, 2100 ppm Sty) was achieved in the first reactor, and a complete conversion was achieved in the second reactor. The polymer from the second reactor was analyzed by SEC, and had the following properties: Mn=84,500, Mw=166,000, MWD=1.964.

The microstructure and styrene block content was measured by 1H-NMR. The following results were obtained: styrene=26.4%, vinyl (1,2-polybutadiene, calculated on the butadiene fraction)=24.3%, block styrene=2%.

Example 9, E9 Example with Coupling with Tetramethoxysilane (TMS)

The polymerization was performed in the same manner as in Example 1, except that TMS (tetramethoxysilane) was added in the second reactor. The following conditions were used: a) weight ratio of styrene to butadiene of 42 to 58, b) molar ratio of DTHFP to active butyl lithium (mol/mol) of 0.214, c) molar ratio of 1,2-Bde to active lithium/(mol/mol) of 0.194, d) total mol Li/"kg of monomers" of 0.0123 and e) molar ratio of TMS to active lithium of 0.214 (mol/mol).

The following amounts were fed into the first polymerization reactor: Sty=3.24 g/min, Bde=4.48 g/min, cyclohexane=56.61 g/min, BuLi=0.118 mmol/min (0.020 mmol/min of BuLi for impurities and 0.0980 mmol/min of active BuLi), DTHFP=0.021 mmol/min, 1,2-Bde=0.019 mmol/min, TMS=0.0213 mmol/min. The residence time was 72 minutes in each reactor.

A monomer conversion of 96.57% (670 ppm Bde, 3380 ppm Sty) was achieved in the first reactor, and a total monomer conversion of 99.54% (12 ppm Bde, 525 ppm Sty) was achieved in the second reactor. The polymer from the second reactor was analyzed by SEC, and had the following properties: Mn=102,500, Mw=214,500, MWD=2.092. The Mooney Viscosity of the product was 36.

The microstructure and styrene block content was measured by 1H-NMR. The following results were obtained: styrene=41.1%, vinyl (1,2-polybutadiene, calculated on the butadiene fraction)=27.5%, block styrene=4%.

The conversion out of the second reactor was still high, in spite of the presence of the coupling agent in the same CSTR polymerization reactor.

Comparative Example 1, CE1

The Polymerization was performed in the same manner as in Example 1. The following conditions were used: a) weight ratio of styrene to butadiene of 42 to 58, b) molar ratio of DTHFP to active butyl lithium (mol/mol) of 0.166, c) total mol Li/"kg of monomers" of 0.0123 and d) molar ratio of 1,2-Bde to active lithium/(mol/mol) of 1.133.

The following amounts were fed into the first polymerization reactor: Sty=3.24 g/min, Bde=4.48 g/min, cyclohexane=56.61 g/min, BuLi=0.0945 mmol/min, DTHFP=0.0166 mmol/min, 1,2-Bde=0.113 mmol/min. The residence time was 72 minutes in each reactor.

A monomer conversion of 88.75% (5170 ppm Bde, 8100 ppm Sty) was achieved in the first reactor, and a total monomer conversion of 97.08% (715 ppm Bde, 2500 ppm Sty) was achieved in the second reactor. The polymer from the second reactor was analyzed by SEC, and had the following properties: Mn=70,800, Mw=119,300, MWD=1.685.

The microstructure and styrene block content was measured by 1H-NMR. The following results were obtained: styrene=41.6%, vinyl (1,2-polybutadiene, calculated on the butadiene fraction)=37.3%, block styrene=3%.

Comparative Example 2, CE2

The polymerization was performed in the same manner as in Example 1. The following conditions were used: a) weight ratio of styrene to butadiene of 42 to 58, b) molar ratio of DTHFP to active butyl lithium (mol/mol) of 0.169 and c) molar ratio of 1,2-Bde to active lithium (mol/mol) of 1.155.

The following amounts were fed into the first polymerization reactor: Sty=6.48 g/min, Bde=8.95 g/min, cyclohexane=113.21 g/min, BuLi=0.191 mmol/min, DTHFP=0.0336 mmol/min, 1,2-Bde=0.229 mmol/min. The residence time was 36 minutes in each reactor.

A monomer conversion of 85.42% (6850 ppm Bde, 10350 ppm Sty) was achieved in the first reactor, and a total monomer conversion of 88.36% (5000 ppm Bde, 7800 ppm Sty) was achieved in the second reactor. The polymer from the second reactor was analyzed by SEC, and had the following properties: Mn=70,900, Mw=119,000, MWD=1.678.

The microstructure and styrene block content was measured by 1H-NMR. The following results were obtained: styrene=39.3%, vinyl (1,2-polybutadiene, calculated on the butadiene fraction)=38.4%, block styrene=2%.

A summary of some polymerization conditions are shown below in Table 2.

TABLE 2

Polymerization Conditions for Examples 1-9 and Comp. Examples 1 and 2

| Polym. | moles of 1,2-Bde$^a$ (mmol/min) | moles of active initiator (I*)$^b$ (mmol/min) | molar ratio of 1,2-Bde/ mole I* (mol/mol) | moles of polar agent (DTHFP) (mmol/min) | molar ratio of polar agent/ mole I* (DTHFP/I*) (mol/mol) |
|---|---|---|---|---|---|
| E1 | 0.0125 | 0.0763 | 0.164 | 0.0130 | 0.17 |
| E2 | 0.0303 | 0.0826 | 0.366 | 0.0166 | 0.201 |
| E3 | 0.0756 | 0.0929 | 0.814 | 0.0166 | 0.179 |
| E4 | 0.0306 | 0.152 | 0.201 | 0.0336 | 0.221 |
| E5 | 0.0611 | 0.159 | 0.384 | 0.0336 | 0.211 |
| E6 | 0.0917 | 0.166 | 0.552 | 0.0336 | 0.202 |
| E7 | 0.153 | 0.181 | 0.845 | 0.0336 | 0.186 |
| E8 | 0.032 | 0.092 | 0.348 | 0.018 | 0.196 |
| E9 | 0.019 | 0.098 | 0.194 | 0.021 | 0.214 |
| CE1 | 0.113 | 0.0945 | 1.133 | 0.0166 | 0.166 |
| CE2 | 0.229 | 0.0946 | 1.155 | 0.0336 | 0.169 |

$^a$Moles of 1,2-Bde added to the polymerization of reactor 1.
$^b$I* refers to the "active initiator."
For example, the active butyllithium ($\dot{n}_{I^*}$ [mol/min]) was recalculated at end of polymerization, based on the number average molecular weight Mn of the final polymer (calculated as SSBR), the conversion, and the total charged amount of monomers ($\dot{m}_{Bde}$(g/min) + $\dot{m}_{Sty}$(g/min)).

$$\dot{n}_{I^*}\,(\text{mol/min}) = \frac{(\dot{m}_{Bde}(\text{g/min}) + \dot{m}_{Sty}(\text{g/min})) \times C}{Mn(\text{g/mol})}, \text{ where}$$

C = Total Monomer Conversion (%), and Mn = Number Average Molecular Weight

A summary of the polymer properties for the inventive and comparative polymers are shown in Table 3.

TABLE 3

Polymer Properties

| Polym. | Mn g/mol | Mw g/mol | Mw/ Mn | Vinyl* wt % | Styrene wt % | Block fraction** wt % | Total Monomer Conv. (2nd reactor) % |
|---|---|---|---|---|---|---|---|
| E1 | 98900 | 213700 | 2.16 | 24.6 | 41.9 | 6 | 99.9 |
| E2 | 91100 | 174700 | 1.917 | 26.5 | 42.4 | 6 | 99.97 |
| E3 | 78150 | 138300 | 1.77 | 31.1 | 42.2 | 3 | 99.72 |
| E4 | 91600 | 169900 | 1.855 | 27 | 42.5 | 7 | 99.67 |
| E5 | 88800 | 162800 | 1.833 | 29.2 | 42.4 | 6 | 99.03 |
| E6 | 85300 | 151500 | 1.776 | 30.6 | 42.3 | 3 | 99.18 |
| E7 | 78600 | 134500 | 1.712 | 33.8 | 41.5 | 2 | 98.32 |
| E8 | 84500 | 166000 | 1.964 | 24.3 | 26.4 | 2 | 100 |
| E9*** | 102500 | 214500 | 2.092 | 27.5 | 41.1 | 4 | 99.54 |
| CE1 | 70800 | 119300 | 1.685 | 37.3 | 41.6 | 3 | 97.08 |
| CE2 | 70900 | 119000 | 1.678 | 38.4 | 39.3 | 2 | 88.36 |

*Vinyl = weight fraction butadiene incorporated into polymer at the 1,2 positions
**Block fraction = styrene block fraction
***Coupled polymer It has been discovered that the use of DTHFP and 1,2-butadiene, in combination in the reagent ratios claimed in this invention, allow for the polymerization of a low vinyl SSBR copolymer with very high conversion and low styrene block content. It has also been discovered that these polymerizations have very high monomer conversions.

Figure 2:
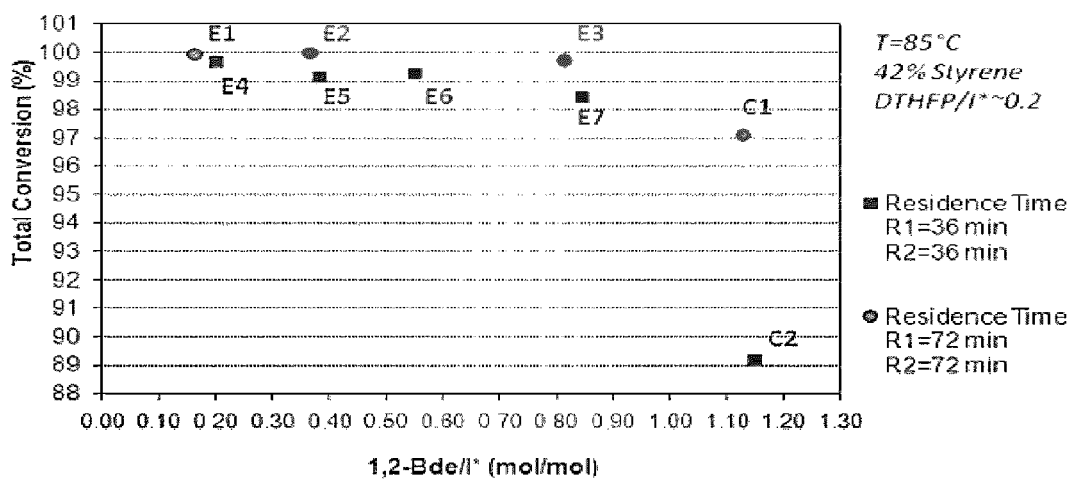
FIG. 2 shows the trend of the conversion as function of the 1,2-butadiene/active initiator molar ratio with two reactors and a residence time of 36 and 72 minutes in each polymerization reactor.

FIG. 1 shows the vinyl content as a function of the "1,2-butadiene/active initiator" molar ratio, and FIG. 2 shows the total monomer conversion as a function of the 1,2-butadiene/active initiator ratio. The trends are reported for a residence time of 72 minutes in each polymerization reactor (Example 1, 2, 3 and Comp. Example 1), and a residence time of 36 minutes in each polymerization reactor (Example 4, 5, 6, 7 and Comp. Example 2). The data show that the "1,2-butadiene/active initiator" molar ratio from 0.1 to 1.0, produces, at a high monomer conversion (greater than 98 wt %), a "low vinyl" SSBR polymer, with a vinyl content from 24-34 wt %. When the "1.2-butadiene/active initiator" ratio is higher than 0.9 (Comp. Examples 1 and 2), the total monomer conversion decreases below 98%.

Although the invention has been described in considerable detail in the preceding examples, this detail is for the purpose of illustration, and is not to be construed as a limitation on the invention, as described in the following claims.

The invention claimed is:

1. A composition comprising a polymer comprising monomeric units derived from styrene and 1,3-butadiene, and wherein the polymer comprises:
   A) a vinyl content from 20 to 30 weight percent, based on the weight of polymerized butadiene in the polymer,
   B) a block styrene content less than 8 weight percent, based on the weight of styrene in the polymer, and
   C) a styrene content from 10 to 50 weight percent, based on the weight of the polymer,
wherein the polymer is polymerized in the presence of a 1,2-diene, an active initiator, and at least one polar agent,
   wherein the 1,2-diene to active initiator molar ratio is from 0.1 to 1.0,
   wherein the polar agent to the active initiator molar ratio is from 0.05 to 0.6,
   wherein the polymer has a number average molecular weight (Mn) from 70,000 to 300,000 g/mole, wherein the composition does not comprise an oil, wherein the polar agent is ditetrahydrofurylpropane and wherein the 1,2-diene is 1,2 butadiene.

2. The composition of claim 1, wherein the polymer has a molecular weight distribution from 1.5 to 3.

3. The composition of claim 1, wherein the polymer has a Mooney Viscosity from 30 to 90.

4. An article comprising at least one component formed from the composition of claim 1.

5. The composition of claim 1, wherein the composition contains less than 2400 ppm residual styrene.

6. The composition of claim 1, wherein the composition contains less than 1000 ppm of residual monomers.

7. The composition of claim 1, wherein the polymer has a weight average molecular weight from 105,000 to 1,500,000 g/mole.

8. The composition of claim 1, wherein the polymer is living.

9. The composition of claim 1, wherein the block styrene content is less than 6 weight percent, based on the weight of styrene in the polymer.

10. The composition of claim 1, wherein the styrene content is from 20 to 43 weight percent, based on the weight of the polymer.

11. The composition of claim 1, wherein the polymer has a molecular weight distribution from 1.7 to 2.2.

* * * * *